United States Patent [19]

Manda et al.

[11] Patent Number: 4,570,211

[45] Date of Patent: Feb. 11, 1986

[54] POWER SUPPLY CIRCUIT FOR DRIVING A MOTOR

[75] Inventors: Yasutake Manda; Tadao Miyabayashi, both of Tokyo; Sakuo Fukumoto, Yokohama, all of Japan

[73] Assignee: Tokyo Electric Co. Ltd., Tokyo, Japan

[21] Appl. No.: 487,521

[22] Filed: Apr. 22, 1983

[30] Foreign Application Priority Data

Apr. 30, 1982 [JP] Japan ................................. 57-72695

[51] Int. Cl.$^4$ ........................................... H02M 3/335
[52] U.S. Cl. ........................................ 363/23; 363/86; 363/142; 323/266
[58] Field of Search ....................... 363/37, 22, 23, 86, 363/89, 142, 143, 20, 21, 24, 25; 323/266, 311, 281, 273, 275

[56] References Cited

U.S. PATENT DOCUMENTS

| | | | |
|---|---|---|---|
| 2,897,431 | 7/1959 | Wolfendale | 323/311 |
| 3,022,457 | 2/1960 | Doan | 323/311 |
| 3,207,973 | 6/1961 | Smith | 363/89 |
| 3,652,919 | 3/1972 | Harrigan | 363/89 |
| 4,004,209 | 1/1977 | Lawson, Jr. | 363/37 |
| 4,088,937 | 5/1978 | Uchida et al. | 363/142 |

FOREIGN PATENT DOCUMENTS

| | | | |
|---|---|---|---|
| 52-41854 | 3/1977 | Japan | 323/273 |
| 55-122476 | 9/1980 | Japan | 363/21 |

Primary Examiner—Peter S. Wong
Assistant Examiner—Judson H. Jones
Attorney, Agent, or Firm—Frishauf, Holtz, Goodman & Woodward

[57] ABSTRACT

A power supply circuit for driving a motor includes a rectifier circuit and a converter circuit for stepping down the DC voltage from the rectifier circuit to drive a motor. The power supply circuit further includes a regulator circuit which is energized by the DC output voltage from the converter circuit to supply a constant voltage or current to the motor.

7 Claims, 7 Drawing Figures

POWER SUPPLY CIRCUIT FOR DRIVING A MOTOR

BACKGROUND OF THE INVENTION

This invention relates to a power supply circuit for driving a motor, which can be connected to AC power sources providing different source voltages.

Commercial AC power sources available in various parts of the world provide different voltages. Therefore, domestic electric products such as electric shavers and cassette tape recorders sometimes cannot be powered by a commercial AC power source in a foreign country. Accordingly, there have been attempts to develop a power supply circuit for a motor to be used in an electric product, such as an electric shaver or a cassette tape recorder, which can be powered by different commercial AC power sources.

Figure 1:
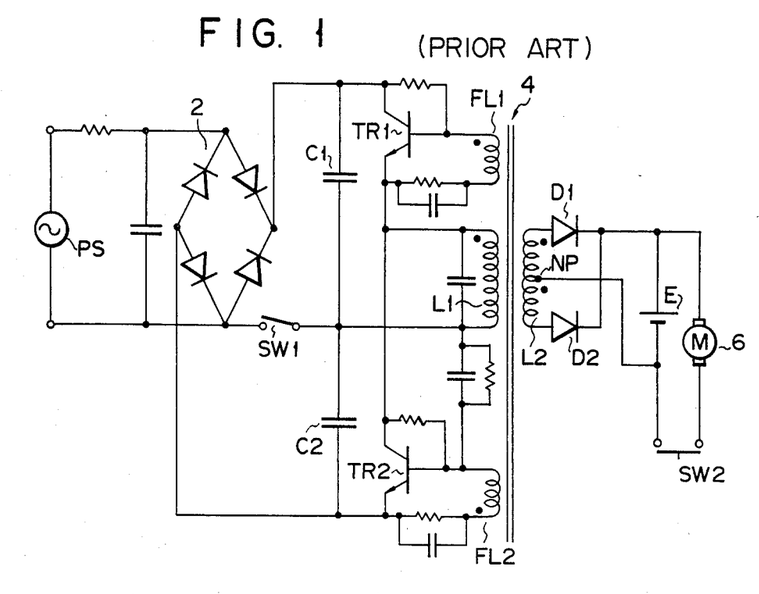
FIG. 1 is a circuit diagram showing a prior art power supply circuit for driving a motor.

FIG. 1 shows a prior art power supply circuit for a motor driver of the type mentioned. It includes a full-wave rectifier circuit 2 for rectifying an AC voltage from an AC power source PS, capacitors C1 and C2 connected in series between the output terminals of the full-wave rectifier circuit 2, a switch SW1 connected between the connection point between the capacitors C1 and C2 and one of the input terminals of the full-wave rectifier circuit 2, and a half-bridge type DC-DC converter 4 for stepping down the DC voltage between the output terminals of the full-wave rectifier circuit 2. A chargeable battery e is connected between the output terminals of the converter 4, and also a motor 6 as a load is connected in series with a switch SW2 between these output terminals.

The half-bridge type DC-DC converter 4 has a well-known construction including npn transistors TR1 and TR2, primary and secondary windings L1 and L2 inductively coupled, feedback windings FL1 and FL2 inductively coupled with the primary winding L1, and diodes D1 and D2. The npn transistors TR1 and TR2 have their current paths connected in series between the output terminals of the full-wave rectifier circuit 2. The primary winding L1 has one terminal connected to the connection point between the npn transistors TR1 and TR2 and the other terminal connected to the connection point between the capacitors C1 and C2. The feedback windings FL1 and FL2 are respectively connected between the bases and emitters of the respective transistors TR1 and TR2. The diodes D1 and D2 have their anodes connected to the respective opposite ends of the secondary winding L2 and their cathodes connected together. The output voltage of the converter 4 appears between the connection point of the diodes D1 and D2 and a neutral point NP of the secondary winding L2.

With the motor power supply circuit shown in FIG. 1, a DC voltage V1 obtained from the full-wave rectifier circuit 2 appears between the output terminals of the series capacitor circuit of the capacitors C1 and C2 when the switch SW1 is in the OFF position. The DC-DC converter 4 generates a voltage equal to 1/n (n being the turn ratio between the primary and secondary windings L1 and L2) times the DC voltage V1. When the switch SW2 is in the OFF position, the battery E can be charged, while when it is in the ON position, the motor 6 can be driven.

Further, when the switch SW1 is in the ON position, the half-wave rectifier circuit 2 functions as a voltage doubler rectifier. In this case, a DC voltage V2 is supplied to the converter 4, and the converter 4 generates a DC voltage V2/n.

The switch SW1 may be set ON when the motor power supply circuit shown in FIG. 1 is connected to, for instance, a 100-V AC power source, while it may be set OFF when the power supply circuit is connected to a 200-V AC power source. By so doing, a substantially equal effective voltage is applied to the DC-DC converter 4 when the 100-V AC power source is connected to the power supply circuit and when the 200-V AC power source is connected. The battery E or motor 6 can thus be supplied with a predetermined voltage. As has been shown, the motor power supply circuit can be connected to two different AC power sources. However, it is necessary that the ratio of the effective output voltages in these two cases be 2:1. That is, it cannot be adapted for use with 100-V and 150-V AC voltage, for instance. In addition, the switch SW1 has to be operated according to the AC power source that is used with the power supply circuit. If the switch SW1 is operated erroneously, the motor 6 may fail to be driven or may be damaged.

SUMMARY OF THE INVENTION

An object of the present invention is to provide a power supply circuit which is operative with different AC source voltages to drive a motor stably and reliably.

According to the present invention the above object is attained by a power supply circuit which comprises a rectifier circuit for rectifying an AC source voltage, a converter circuit for stepping down a DC voltage from the rectifier circuit, and a regulator circuit operated by the DC voltage of the converter circuit to supply a constant voltage or current to a motor to be driven.

The regulator circuit which is operated by the DC voltage of the converter circuit supplies a constant voltage or current to the motor even when different AC source voltages are used. The motor can thus be driven stably and reliably at all times.

DETAILED DESCRIPTION OF THE PREFERRED EMBODIMENTS

Figure 2:
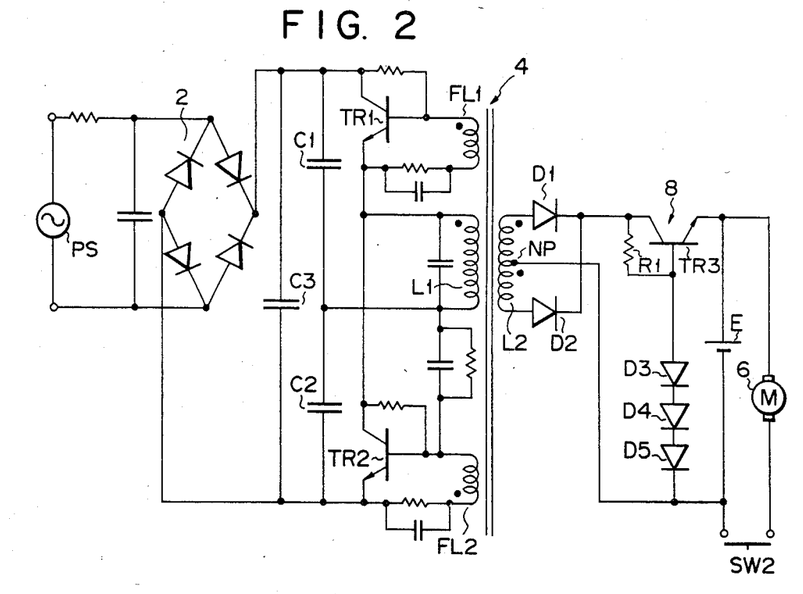
FIG. 2 is a circuit diagram of a power supply circuit for driving a motor with a constant voltage circuit according to one embodiment of this invention.

FIG. 2 shows an embodiment of the power supply circuit according to the invention. A full-wave rectifier circuit 2 rectifies an AC voltage from an AC power source PS. Capacitors C1 and C2 are connected in series between the output terminals of the full-wave rectifier circuit 2. A smoothing capacitor C3 smoothes the output voltage of the full-wave rectifier circuit 2. A half-bridge type DC-DC converter 4 steps down the output voltage of the full-wave rectifier circuit 2. A constant voltage circuit 8 is energized by the output voltage of the converter 4 to provide a constant voltage. A chargeable battery E is connected between the output terminals of the constant voltage circuit 8. A motor 6 is connected in series with a switch SW2 between the output terminals of the constant voltage circuit 8.

The DC-DC converter 4 has the same construction as that shown in FIG. 1, including npn transistors TR1 and TR2, primary and secondary windings L1 and L2, feedback windings FL1 and FL2 and diodes D1 and D2. The constant voltage circuit 8 includes an npn transistor TR3, a resistor R1 and three diodes D3 to D5. The collector of the npn transistor TR3 is connected to the high-potential output terminals of the DC-DC converter 4, i.e., the cathode of each of the diodes D1 and D2. The resistor R1 is connected between the base and collector of the transistor TR3. The diodes D3 to D5 are connected in series and in a forward-bias direction between the base of the transistor TR3 and the low-potential output terminal of the DC-DC converter 4, i.e., the neutral point NP of the secondary winding L2.

With the power supply circuit shown in FIG. 2, the AC voltage from the AC power source PS is rectified by the full-wave rectifier circuit 2, smoothed by the smoothing capacitor C3 and then stepped down by the DC-DC converter 4. The constant voltage circuit 8 is operated by the output voltage of the DC-DC converter 4 to generate a constant voltage between its output terminals, i.e., between the emitter of the transistor TR3 and the cathode of the diode D5. When the switch SW2 is in the OFF position, the battery E is charged by the constant voltage applied to it. When the switch SW2 is in the ON position, the constant voltage from the constant voltage circuit 8 is applied to the motor 6 to drive the motor 6 stably and reliably. When the switch SW2 is turned on with the power source disconnected, the motor 6 is driven by the battery E.

Denoting the output voltage of the DC-DC converter 4 by VC3 and the base and emitter voltages on the transistor TR3 by VB3 and VE3 respectively, the following relations hold:

$$VE3 = VC3 - VCE \quad (1)$$

and $$VE3 = VB3 - VBE \quad (2)$$

where VCE and VBE are respectively the collector-emitter voltage and base-emitter voltage of the transistor TR3.

Since the voltages VB3 and VBE are substantially constant, the voltage VE3 is substantially constant, as is apparent from the equation (2). In other words, a change in the voltage VC3 causes a corresponding change in the voltage VCE to hold the voltage VE3 constant, as can be seen from the equation (1).

For example, when the output voltage of the AC power source PS is doubled, the output voltage VC3 of the DC-DC converter 4 is also doubled. In this case, however, an increase of the voltage VC3 increases the collector-emitter voltage VCE of the transistor TR3 to hold the emitter voltage VE3 constant. It should be appreciated that the constant voltage circuit 8 provides a substantially constant output voltage irrespective of a change in the AC power source voltage supplied to the rectifier circuit 2. It is thus possible to reliably charge the battery E and also to drive the motor 6 stably and reliably.

If the ratio between a current flowing through the collector of the transistor TR3 when the switch SW2 is in the ON position and that obtained when the switch is in the OFF position is 10:1, the ratio of power consumption of the transistor TR3 in the former and latter cases is also 10:1. Thus, the power consumption of the transistor TR3 is low, and the battery E can be charged for a long period of time with the switch SW2 set in the OFF position without any possibility of damaging the transistor TR3 due to overheating. Further, the output voltage of the constant voltage circuit 8 may be set to be sufficiently low so that a small size motor can be used as the motor 6.

Figure 3:
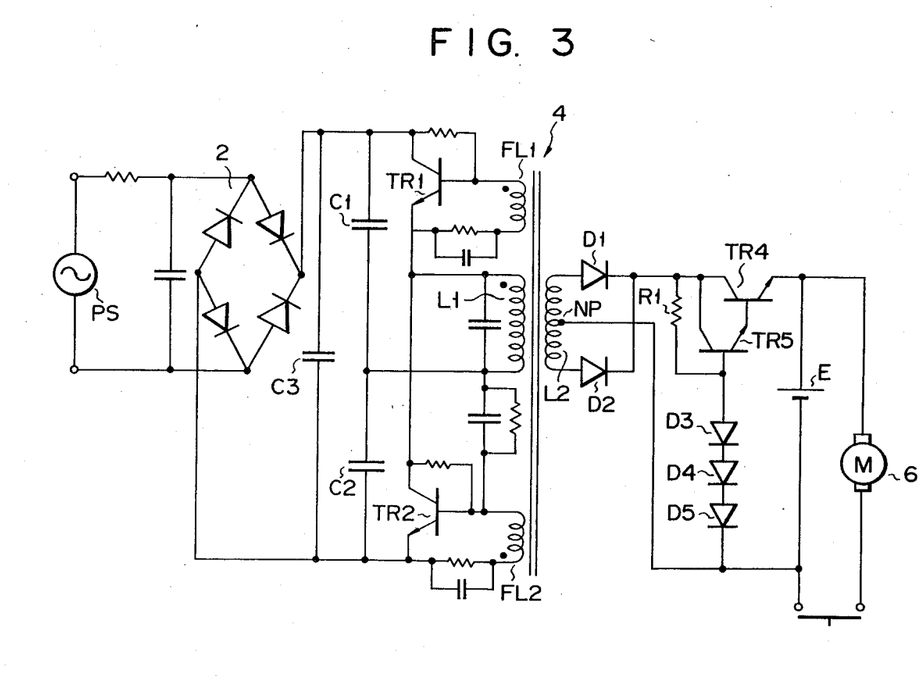
FIG. 3 is a circuit diagram showing a modification of the power supply circuit shown in FIG. 2.

FIG. 3 shows a modification of the power supply circuit shown in FIG. 2. This circuit uses a Darlington circuit including npn transistors TR4 and TR5 in lieu of the transistor TR3 in the circuit of FIG. 2. The remainder of the circuit is the same as that of FIG. 2. The transistors TR4 and TR5 have their collectors connected together. The collector and base of the transistor TR5 are connected to the opposite terminals of the resistor R1 respectively. The emitter of the transistor TR5 is connected to the base of the transistor TR4.

In the power supply circuit of FIG. 3, the emitter voltage VE4 on the transistor TR4 is given as $$VE4 = VB4 - 2VBE \quad (3)$$

where VB4 is the base voltage of the transistor TR4. It will be seen that the motor 6 can be driven with a lower voltage than in the case of the power supply circuit of FIG. 2. In addition, a larger drive current can be supplied to the motor 6 owing to the Darlington circuit, so that the stability of the motor 6 can be enhanced.

Figure 4:
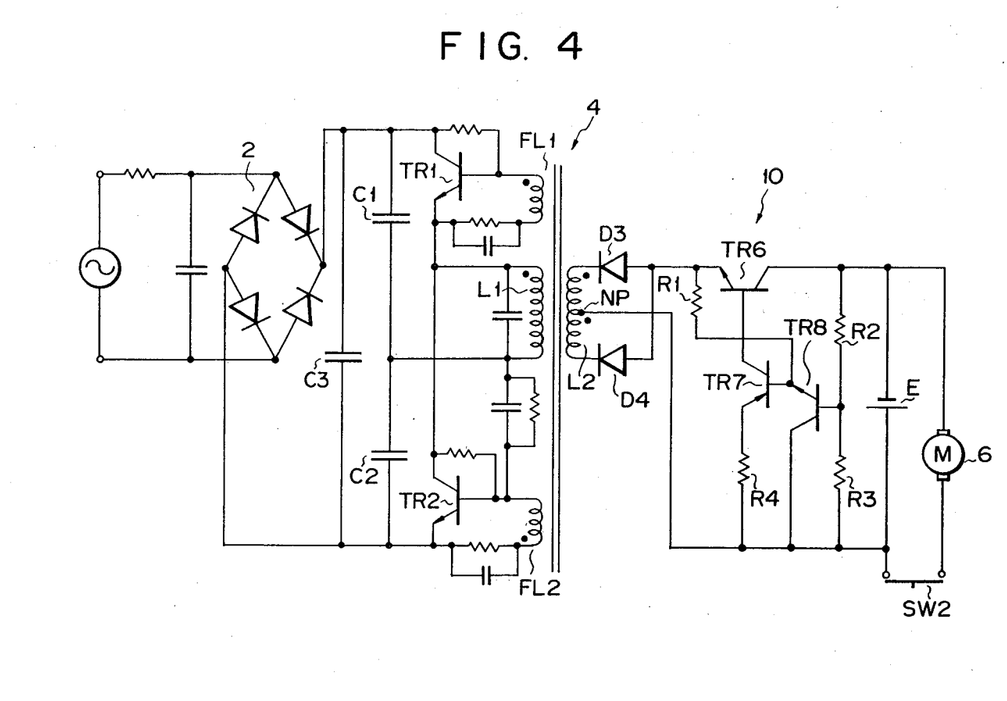
FIG. 4 is a circuit diagram showing a different embodiment of the power supply circuit with a different constant voltage circuit from that shown in FIG. 2.

FIG. 4 shows a different embodiment of the power supply circuit according to the invention. This circuit uses diodes D3 and D4 which are connected with the opposite polarity to that of the diodes D1 and D2 noted before and also uses a constant voltage circuit 10 instead of the constant voltage circuit 8 noted before. The rest of the circuit is the same as the circuit shown in FIG. 2. The constant voltage circuit 10 includes an npn transistor TR6, resistors R2 and R3, a pnp transistor TR7 and an npn transistor TR8. The emitter of the transistor TR6 is connected to the low potential output terminal of the DC-DC converter 4, i.e., the anode of each of the diodes D3 and D4. The resistors R2 and R3 are connected in series between the collector of the transistor TR6 and the high potential output terminal of the comparator 4, i.e., the neutral point NP of the secondary winding L2. The transistor TR7 has the collector connected to the base of the transistor TR6, the emitter connected through the resistor R4 to the neutral point NP of the secondary winding L2, and the base connected through the resistor R1 to the anode of each of the diodes D3 and D4. The transistor TR8 has the emitter connected to the base of the transistor TR7, the collector connected to the neutral point NP of the secondary winding L2 and the base connected to the connection point between the resistors R3 and R2.

In this power supply circuit, a change in the output voltage of the constant voltage circuit 10 causes a corresponding change in the output voltage of the voltage divider of the resistors R2 and R3 to control the conduction resistance of the transistors TR8. As a result, the base voltage of the transistor TR7 is changed so as to change the base current into the transistor TR6 through the resistor R4 and transistor TR7. The collector-emitter voltage VCE of the transistor TR6 is thus changed to keep the collector voltage VC6 of the transistor TR6 at a predetermined voltage.

When, for example, the collector voltage VC6 is increased, the potential on the connection point between the resistors R2 and R3 is increased to reduce the conduction resistance of the transistor TR8. As a result, the base potential on the transistor TR7 is increased to reduce the base current flowing through the resistor R4 and transistor TR7 into the base of the transistor TR6. The base-emitter voltage VCE on the transistor TR6 is thus increased to reduce the collector voltage VC6 to a predetermined value.

The emitter voltage VE6 of the transistor TR6 is given as follows:

$$VE6 = VC6 + VCE \qquad (4)$$

To lower the output voltage of the constant voltage circuit 10, the transistor TR6 may be operated in the saturation mode. In this case, a relation of VBE>VCE can be obtained. With the power supply circuit of FIG. 4 it is possible to reduce the output voltage of the converter 4, i.e., reduce the number of turns of the secondary winding L2, compared to the power supply circuit of FIGS. 2 or 3. By so doing, changes in the output voltage of the converter 4 with fluctuations of the power source voltage can be reduced to minimize the power loss in the transistor TR6.

Figure 5:
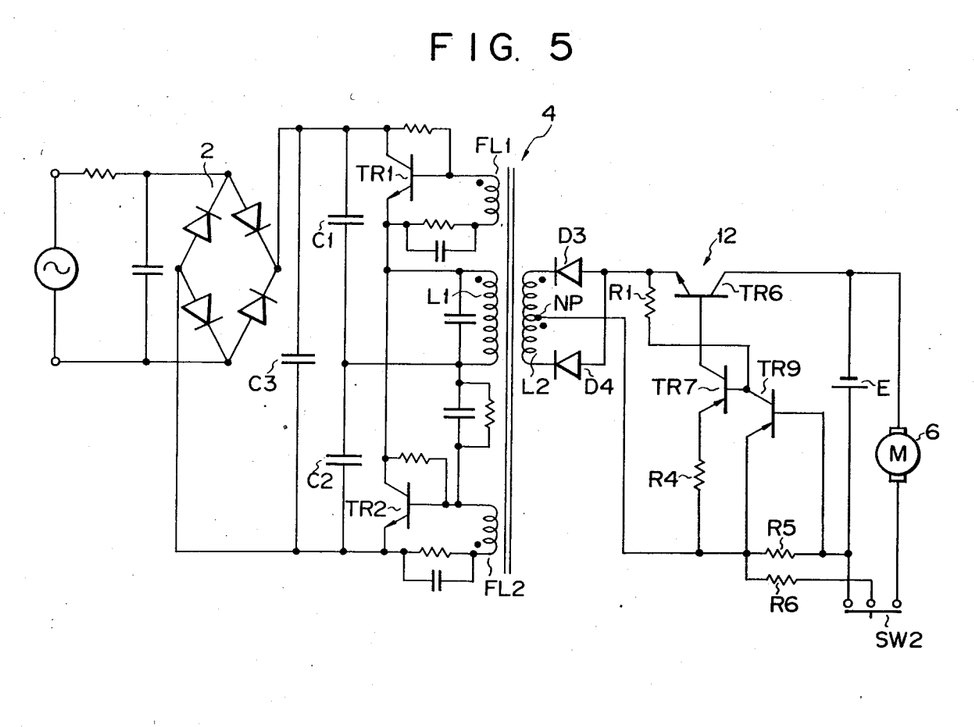
FIG. 5 is a circuit diagram showing a further embodiment of the power supply circuit with a constant current circuit according to this invention.

FIG. 5 shows a power supply circuit according to another embodiment of this invention. This circuit uses a constant current circuit 12 in lieu of the constant voltage circuit 10. The remainder of the circuit is the same as the circuit of FIG. 4. The constant current circuit 12 includes transistors TR6 and TR7, a pnp transistor TR9 and resistors R1, R4, R5 and R6. The pnp transistor TR9 has its emitter connected to the neutral point NP and its base connected through the resistor R5 to its emitter. The resistor R6 is connected between the emitter of the transistor TR9 and the switch SW2.

In this power supply circuit, when the switch SW2 is in the OFF position, a charging current is supplied through the resistor R5 to the battery E. When the switch SW2 is in the ON position, an operating current is supplied through a parallel resistor circuit of the resistors R5 and R6 to the motor 6. When the current through the resistor R5 or through the parallel resistor circuit of the resistors R5 and R6 is increased, the conduction resistance of the transistor TR9 is reduced to increase the collector voltage of the transistor TR9. Thus, the resistors R1 and R5, and transistor TR9 cooperatively constitute a reference voltage generating circuit which keeps the base potential of the transistor TR7 constant. As a result, the conduction resistance of the transistor TR7 is increased to reduce the base current into the transistor TR6. The current flowing through the transistor TR6 is thus limited. In this way, the charging current into the battery E or operating current into the motor 6 can be held constant. That is, the charging current or operating current can be held constant even when the charged voltage of the battery E is low or when the output voltage of the converter 4 is high.

Figure 6:
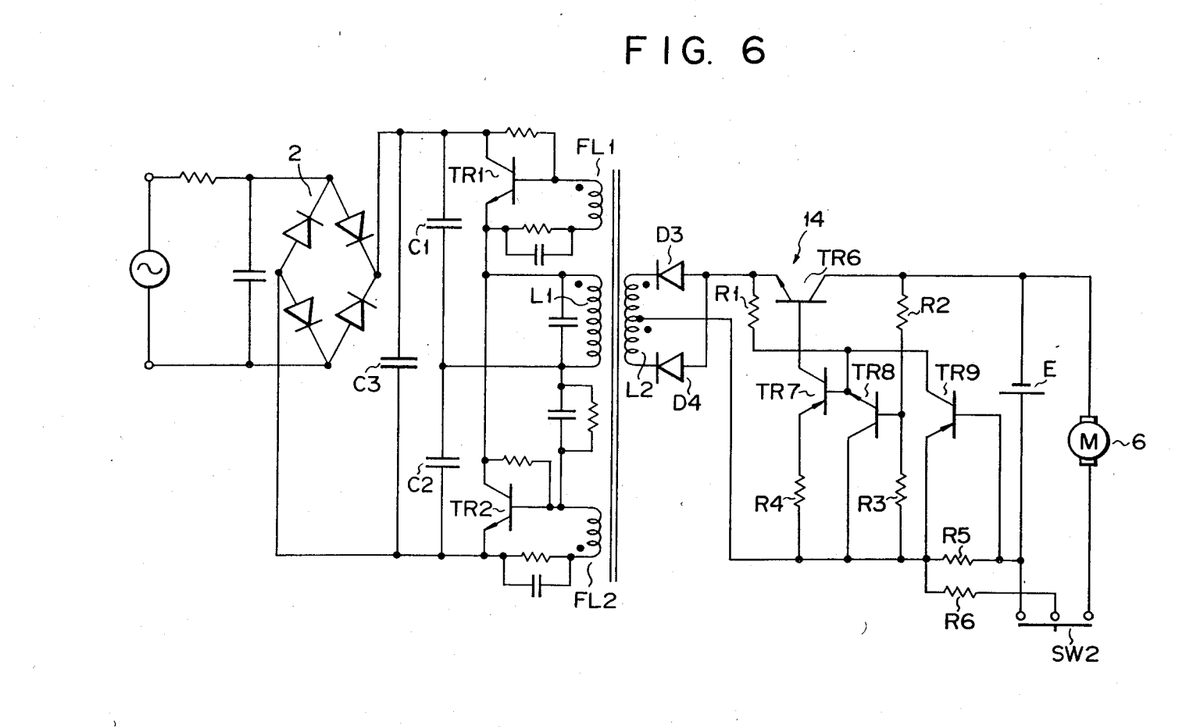
FIG. 6 is a circuit diagram showing a still further embodiment of the power supply circuit with a constant current circuit and a constant voltage circuit according to this invention.

FIG. 6 shows another power supply circuit, which includes a voltage and current regulator circuit 14 having the functions of the constant voltage circuit 10 in FIG. 4 and the constant current circuit 12 in FIG. 5. The regulator circuit 14 includes resistors R1 to R4 and transistors TR6 to TR8 connected in the same manner as in the constant voltage circuit 10 of FIG. 4, and resistors R5 and R6 and a transistor TR9 connected in the same manner as in the constant current circuit 12 of FIG. 5.

In this power supply circuit, it is possible to prevent an excessive charging current from being supplied to the battery E in the discharged state and the life of the battery E from being shortened. It is also possible to prevent an excessive operation current from being supplied to the motor with a heavy load, and the life of the motor 6 from being shortened. Since, with this power supply circuit, the operation of current regulation is effected while an operating current larger than a minimum operation current is supplied to the motor 6, the motor 6 will not be stopped even when a heavy load is applied to it.

Figure 7:
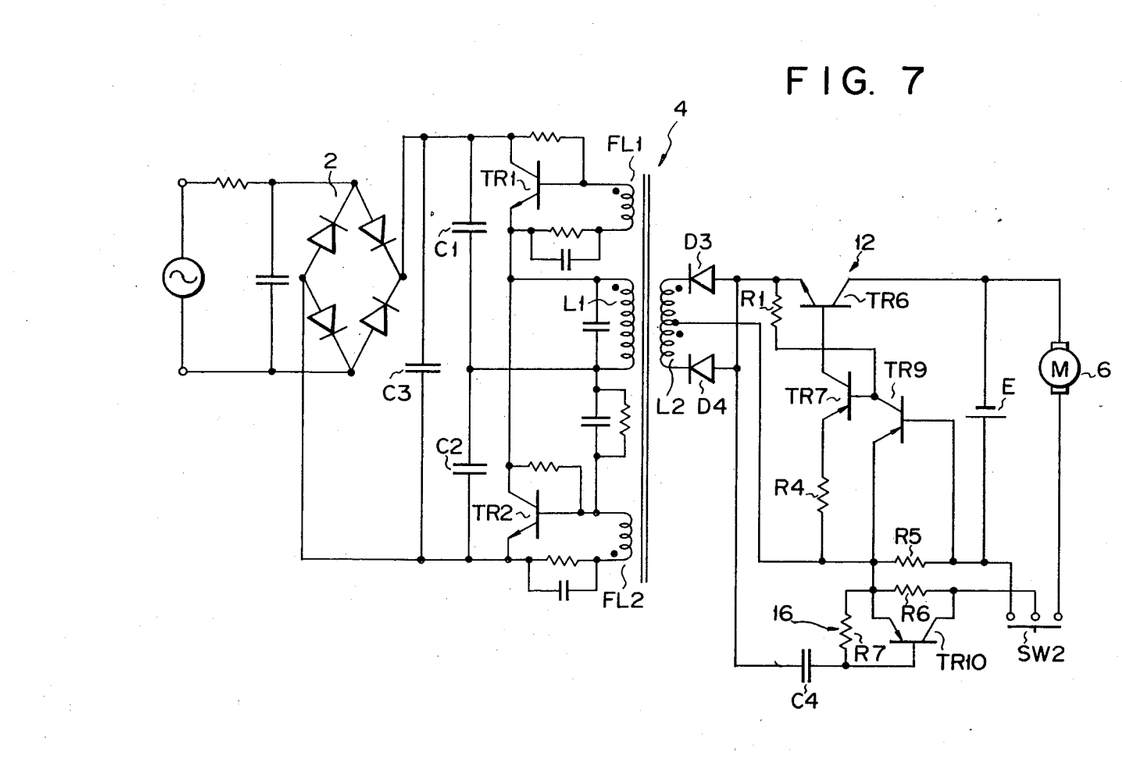
FIG. 7 is a circuit diagram showing a yet further embodiment of the power supply circuit according to this invention which includes a control circuit for controlling the operation at the commencement of operation of the constant current circuit shown in FIG. 5.

FIG. 7 shows another power supply circuit which includes a trigger control circuit 16 connected to a constant current circuit 12. The remainder of the circuit is the same as the circuit of FIG. 5. The trigger control circuit 16 includes a pnp transistor TR10 and a resistor R7. The transistor TR10 has the emitter-collector path connected in parallel with the resistor R6 and the base connected through the capacitor C4 to the anode of each of the diodes D3 and D4. The resistor R7 is connected between the emitter and base of the transistor TR10.

In this power supply circuit, when the switch SW2 is in the OFF position, a charging current is supplied to the battery E. When the switch SW2 is turned on, a high voltage is applied to the emitter of the transistor TR10, causing a base current to flow through the capacitor C4 into the transistor TR10. As a result, the transistor TR10 is turned on, whereupon the base and emitter of the transistor TR9 are conductively coupled together. The current detecting operation of the transistor TR9 is thus stopped, and a sufficiently high starting current is caused to flow through the motor 6. The motor 6 can thus be started quickly and reliably. After the lapse of a predetermined period of time the capacitor C4 is charged to a certain voltage level. As a result, the base current into the transistor TR10 is interrupted to turn off the transistor TR10. The emitter and base of the transistor TR9 are thus coupled together through a parallel resistor circuit of the resistors R5 and R6. Now the transistor TR9 executes the current detecting operation, and a constant current is supplied from the constant current circuit 12 to the motor 6.

The embodiments described in the foregoing are by no means limitative. For example, the polarity of the diodes D1 and D2 in the embodiments of FIGS. 2 and 7 may be reversed. In this case, the polarity of the output terminals of the DC-DC converter 4 are also reversed, and therefore it is necessary to alter the connection of the DC-DC converter 4 to the following stage constant current circuit 8 or 10, constant current circuit 12 or voltage and current regulator circuit 14.

Further, it is possible to alter the conductivity type of the transistors used; for example, the transistors TR3 to TR6 may be replaced by pnp transistors.

What we claim is:

1. A power supply circuit for driving a motor, comprising:

a rectifier circuit for rectifying an AC voltage and for producing a single DC voltage;

a converter circuit for stepping down the single DC voltage from said rectifier circuit and for producing a single converted DC voltage between output terminals; and a regulator circuit coupled to be energized by the single converted DC voltage from said converter circuit for supplying a constant current to a motor to be driven, wherein said regulator circuit includes a first transistor having a current path adapted to be connected between the motor and one of the output terminals of said converter circuit, a voltage generating circuit for generating an output voltage at an output terminal thereof according to a current detected when flowing through said first transistor, first resistance means connected between said one of the output terminals of said converter circuit and the output terminal of said voltage generating circuit, and a control circuit including second resistance means having one terminal connected to the other one of the output terminals of said converter circuit, a second transistor having a current path connected between the base of said first transistor and the other terminal of said second resistance means and a base connected to the other terminal of said first resistance means and to the output terminal of said voltage generating circuit, for controlling the base current in said first transistor according to the output voltage from said voltage generating circuit;

wherein said voltage generating circuit includes third resistance means, a third transistor having a base and an emitter respectively connected to the opposite terminals of said third resistance means and a collector connected to the base of said second transistor; and wherein said third resistance means includes a first resistor and a series circuit of a second resistor and a first switching means, said series circuit means being connected in parallel with said first resistor.

2. A power supply circuit for driving a motor, comprising:

a rectifier circuit for rectifying an AC voltage and for producing a single DC voltage;

a converter circuit for stepping down the single DC voltage from said rectifier circuit and for producing a single converted output DC voltage between output terminals; and a regulator circuit coupled to be energized by the single converted output DC voltage from said converter circuit for supplying at least one of constant voltage and constant current to a motor to be driven, wherein said regulator circuit includes a first transistor having a current path adapted to be connected between the motor and one of the output terminals of said converter circuit, a voltage generating circuit connected between the motor end of the current path of said first transistor and the other one of the output terminals of said converter circuit, for generating an output voltage at an output terminal thereof according to a voltage detected between said motor end of the current path of the first transistor and the other output terminal of said converter circuit, first resistance means connected at one terminal to said one of the output terminals of said converter circuit, and a control circuit including second resistance means having one terminal connected to the other one of the output terminals of said converter circuit, and a second transistor having a current path connected between the base of said first transistor and the other terminal of said second resistance means and a base connected to the other terminal of said first resistance means and to an output terminal of said voltage generating circuit, for controlling the base current in said first transistor according to the output voltage from said voltage generating circuit;

wherein said voltage generating circuit includes a voltage divider circuit connected between the other end of the current path of said first transistor and the other one of the output terminals of said converter circuit, a third transistor having a base connected to an output terminal of the voltage divider circuit and a current path connected between the base of said second transistor and the other one of the output terminals of said converter circuit, and second resistance means connected between said one terminal of the current path of the first transistor and the base of said second transistor; and wherein said voltage generating circuit includes third resistance means, and a fourth transistor having a base and an emitter connected respectively to the opposite ends of said third resistance means and a collector connected to the connection point between said first resistance means and the base of said second transistor.

3. A power supply circuit according to claim 2, wherein said second transistor is a pnp transistor and said third transistor is an npn transistor.

4. A power supply circuit according to claim 1, wherein said second and third transistors are pnp transistors.

5. A power supply circuit according to claim 1, further comprising second switching means connected in parallel with said second resistor.

6. A power supply circuit according to claim 6, wherein said second switching means includes a pnp transistor having an emitter connected to one terminal of said second resistor and also to the other one of the output terminals of said converter circuit and a collector connected to the other terminal of said second resistor, third resistance means connected between the base and emitter of said pnp transistor, and capacitance means connected between the base of said pnp transistor and said one of the output terminals of said converter circuit.

7. A power supply circuit according to claim 2, wherein said second and third transistors are pnp transistors.

* * * * *

UNITED STATES PATENT AND TRADEMARK OFFICE
CERTIFICATE OF CORRECTION

PATENT NO. : 4,570,211
DATED : February 11, 1986
INVENTOR(S) : Yasutake MANDA et al It is certified that error appears in the above-identified patent and that said Letters Patent is hereby corrected as shown below:

Column 8 (claim 6), line 50, change "6" to --5--.

Signed and Sealed this

Eleventh Day of November, 1986

*Attest:*

DONALD J. QUIGG

*Attesting Officer*    *Commissioner of Patents and Trademarks*